July 18, 1933.  A. F. BROTZ  1,918,832
WASHING MACHINE
Filed Dec. 17, 1928  4 Sheets-Sheet 2

WITNESSES
M. E. Downey
C. L. Waal

INVENTOR
Anton F. Brotz
By R. S. Caldwell
ATTORNEY

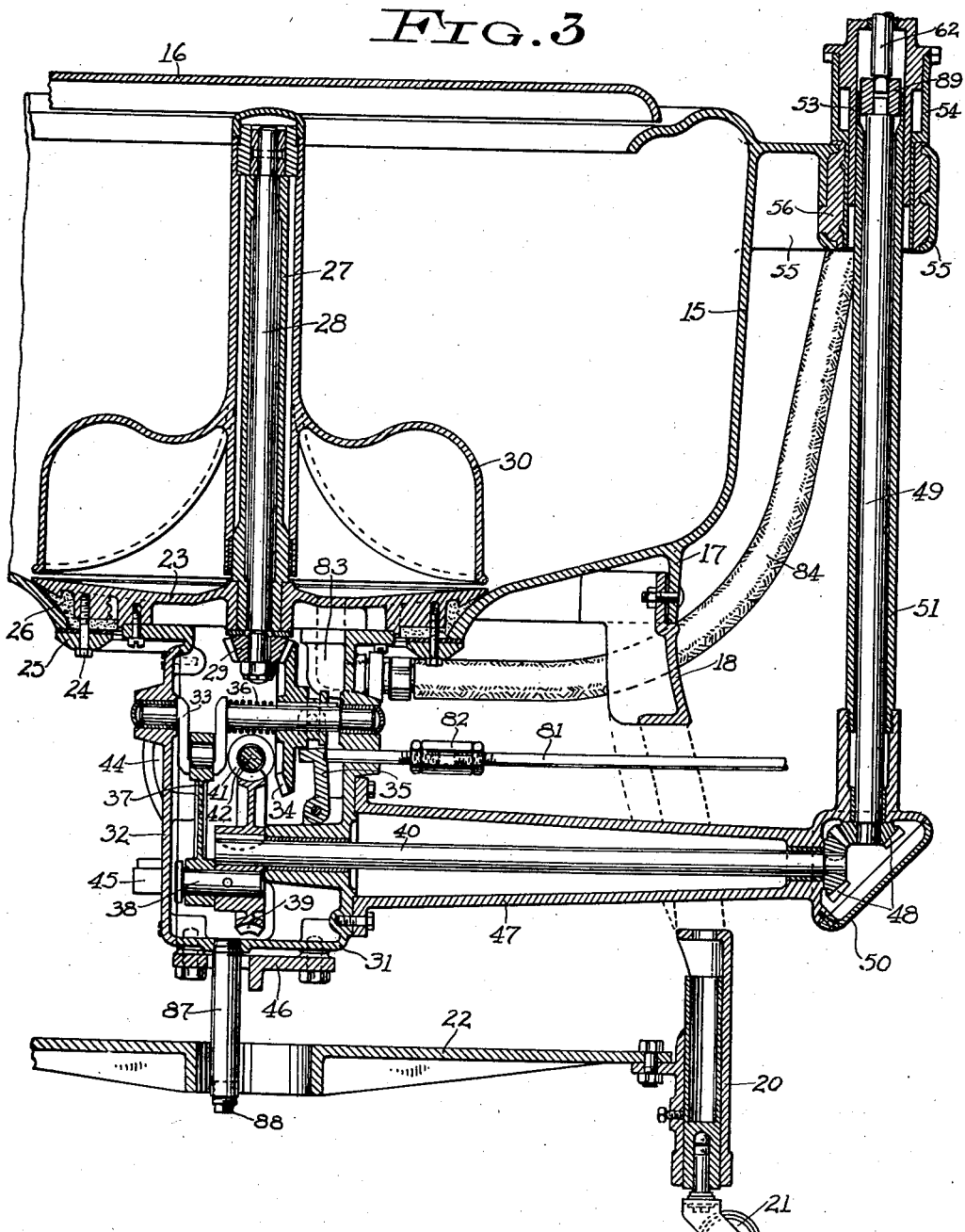

July 18, 1933.  A. F. BROTZ  1,918,832
WASHING MACHINE
Filed Dec. 17, 1928    4 Sheets-Sheet 4
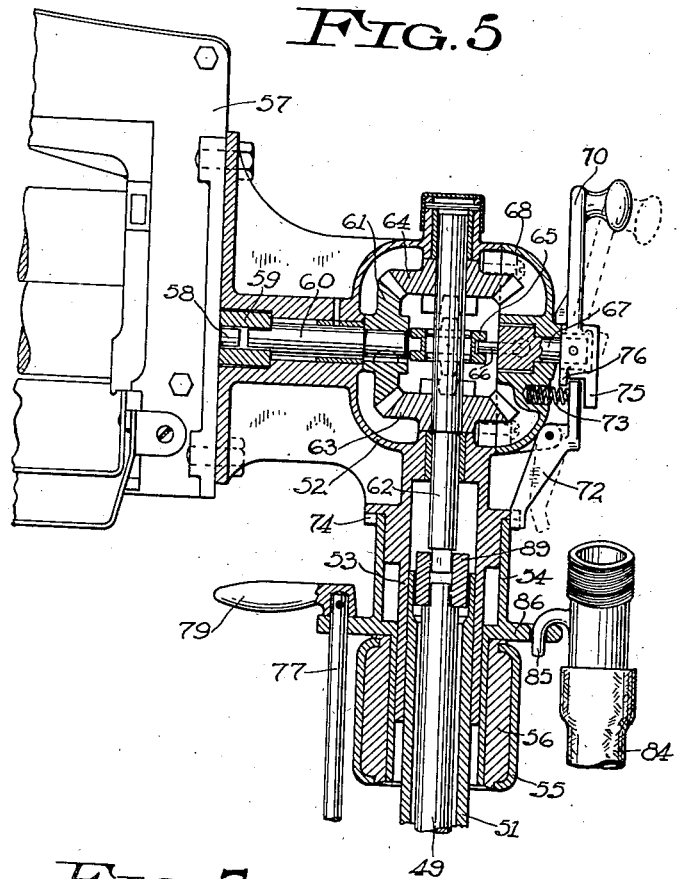
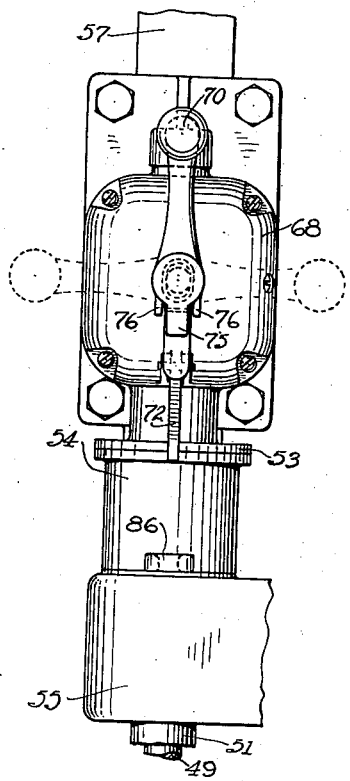
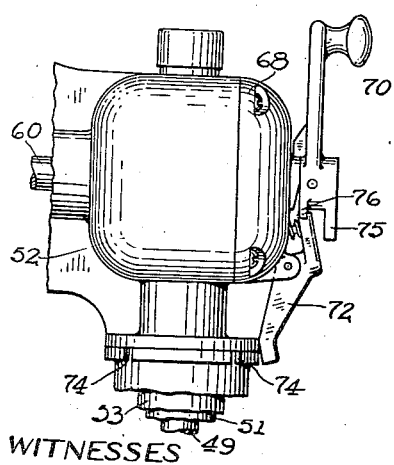
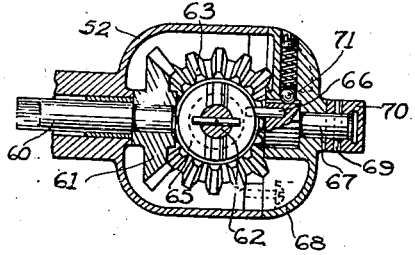
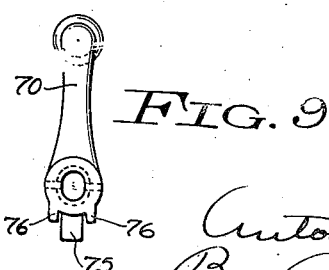

Patented July 18, 1933

1,918,832

UNITED STATES PATENT OFFICE

ANTON FRANK BROTZ, OF KOHLER, WISCONSIN, ASSIGNOR TO KOHLER COMPANY, OF KOHLER, WISCONSIN, A CORPORATION OF WISCONSIN

WASHING MACHINE

Application filed December 17, 1928. Serial No. 326,600.

This invention relates to washing machines of the domestic laundry type and has for its object to provide an electrically driven machine having a unitary power plant which is self-contained and may be readily assembled with the container and impeller mechanism.

Another object of the invention is to provide a power plant for washing machines that will be small and compact, that will require infrequent greasing, freedom from the intrusion of foreign matter and which will be silent in its operation.

Another object of the invention is to provide such a power plant for washing machines that will be suitable for attachment to washing machines of various sizes and styles, being self-contained and independent of the washing machine container except for its supporting attachment thereto.

Another object of the invention is to provide a power plant for washing machines adapted for attachment to and support by a container having a vitreous enamel surface.

Another object of the invention is to provide a power plant for washing machines having a convenient arrangement of operating parts for producing a strong and durable construction that can be manufactured at reasonable cost.

Another object of the invention is to provide a wringer mechanism with safety device for preventing its operation in other than predetermined angular positions.

With the above and other objects in view the invention consists in the washing machine as herein claimed and all equivalents.

Referring to the accompanying drawings, in which like characters of reference indicate the same parts in different views, Fig. 1 is a front elevation of a washing machine constructed in accordance with this invention;

Fig. 3 is a central sectional elevation thereof on the plane of the wringer drive;

Fig. 5 is a sectional elevation of the wringer driving mechanism and lock;

Fig. 6 is an end view thereof;

Fig. 7 is a view of the locking mechanism functioning to prevent the operation of the wringer in a position other than one of its predetermined positions;

Fig. 8 is a sectional plan view of the wringer clutch, and

Fig. 9 is a detail view of the locking clutch handle.

Figure 1:
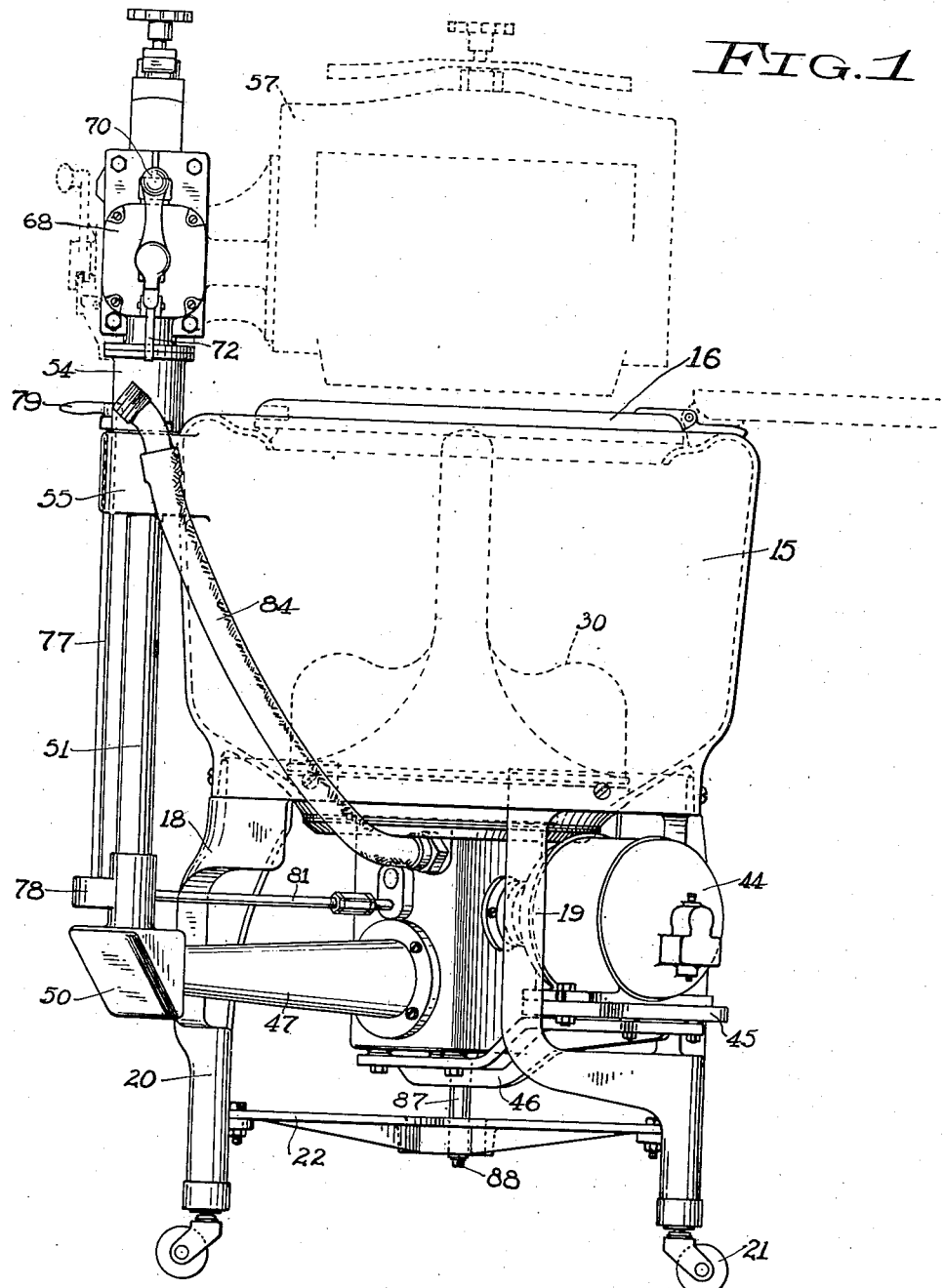
Figure 2:
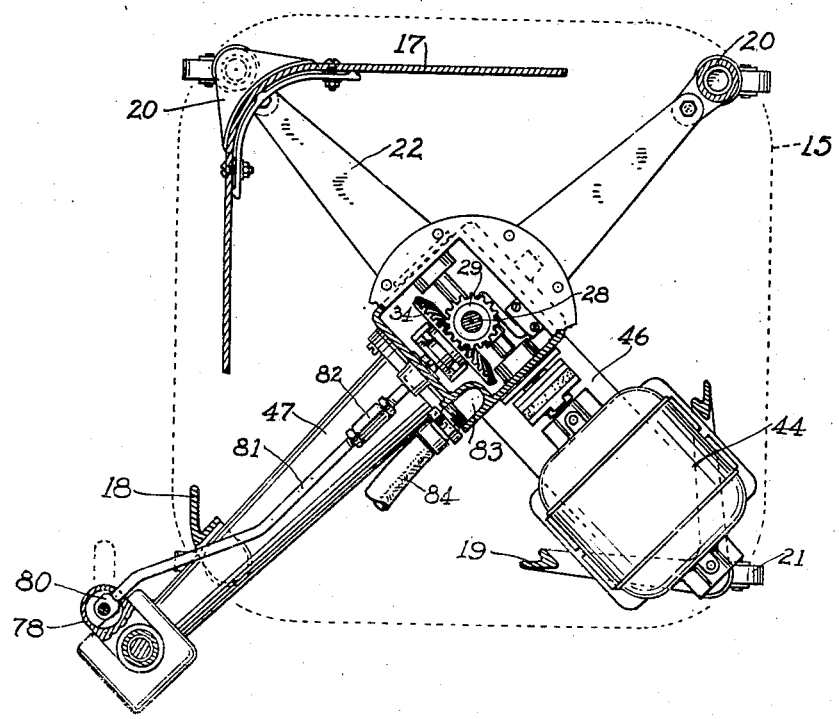
Fig. 2 is a sectional plan view thereof.
Figure 4:
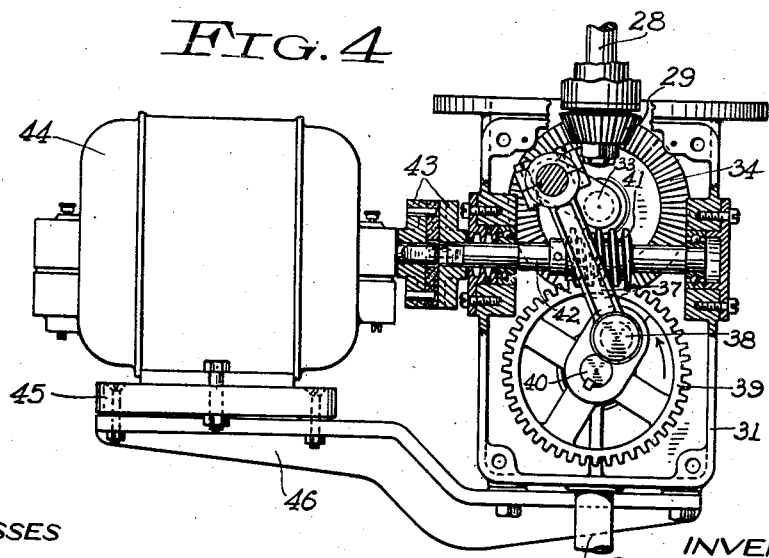
Fig. 4 is a detail view, partly in section, of the motor and the gear box with the cover plate removed.

In these drawings, 15 indicates a container, preferably with a porcelain enameled lining and with a hinged cover 16, and having on its centrally sloping bottom a vertical supporting flange 17 by means of which it is attached to variously shaped leg members 18, 19 and 20, mounted on adjustable casters 21 and connected together by a cross-shaped spider 22.

The centrally sloping bottom of the container 15 has a central flaring opening in which is fitted a disk-shaped mounting plate 23, which is clamped in place by screws 24 connecting it with a clamping ring 25 fitting beneath the edge of the opening. The edge of the opening in the bottom of the container is thus clamped between the feathered edge of the mounting plate 23 and the clamping ring with a filling of plastic sealing material 26 between them. In the center of the mounting plate is fitted an upstanding stationary tube 27, in which a vertical shaft or spindle 28 rotates with a driving pinion 29 on its lower end beneath the mounting plate and with driving connection at its upper projecting end with an impeller 30 fitting thereon and having a bearing on the tube 27 near the mounting plate.

A gear-case 31 is detachably mounted on the bottom of the mounting plate by means of a surrounding flange at its upper end, and journaled in bearings in the gear-case and in a removable cover 32 thereof is a crank-shaft 33 having a beveled gear 34 splined thereon and capable of being moved by a clutch yoke 35 into mesh with the beveled pinion 29, but receiving the thrust of a coiled spring 36 around the crank-shaft between it and the crank to move it out of mesh with the beveled pinion.

A connecting rod 37 connects the crank of crank-shaft 33 with a wrist-pin 38 on a worm wheel 39, which is keyed on a shaft 40 having a bearing in the lower part of the gear-case 32, the throw of the crank being greater than the throw of the wrist-pin so that revolutions of the latter produce only oscillations of the former. The worm wheel 39 meshes with a worm 41 on a worm-shaft 42 journaled in bearings in the opposite walls of the gear-case and said worm-shaft is connected by a shaft coupling 43 with the shaft of an electric motor 44 mounted on an insulating base 45, which, in turn, is mounted on a bracket 46 detachably connected to the bottom of the gear-case.

The electric motor, which is controlled by any convenient switch, not shown, thus serves to drive the worm shaft and, through the worm gearing, also drives the shaft 40 for the wringer mechanism to be later described, and causes the oscillation of crank-shaft 33 to effect a reciprocal drive of the impeller 30 at times when the beveled gearing connection is in mesh.

The wringer drive-shaft 40 is surrounded by the tubular bracket or housing 47 mounted on the side of the gear-case 31, said shaft being journaled at the outer end of the bracket where it is connected by intermeshing beveled gears 48 with the vertical shaft 49, which is also journaled in the bracket. A removable cover 50 is provided for the gear chamber in which the beveled gears 48 are located, and an enclosing tube 51 surrounds the vertical shaft.

An upper gear housing 52 has a downwardly extending tubular portion 53, which loosely surrounds the enclosing tube 51 of the vertical shaft and is mounted to turn in a wringer support sleeve 54, which is firmly secured in a hollow integral projection 55 of the container 15. As the parts are fitted and assembled for attachment to the container the convenient means for securing the wringer support sleeve 54 within the hollow projection 55 consists of a filling 56 of lead or other low temperature fusing metal. The mechanism attached to the mounting plate 23 and all assembled and fitted for operation may thus be readily attached to the container by securing said mounting plate in place in the bottom of the receptacle and then securing the wringer support sleeve in place in the projection 55 by pouring molten metal between them.

The upper gear housing 52 supports a wringer 57, the shaft 58 of which is connected by a coupling 59 with a shaft 60 journaled in the housing and bearing a beveled pinion 61. A vertical shaft 62, also journaled in the housing and connected by coupling 89 with vertical shaft 49 has loosely mounted on it beveled pinions 63 and 64 in mesh with pinion 61 and bearing clutch teeth, by means of which one or the other may be engaged with the vertical shaft 62 by a toothed grooved clutch sleeve 65 splined on the vertical shaft 62. The clutch sleeve is raised or lowered by means of an eccentrically positioned pin 66 on the enlarged shouldered end of a clutch shaft 67, which is journaled through a cover 68 of the upper gear housing 52, the projecting end of said shaft having a transverse pin 69, on which is pivotally mounted a handle member 70 capable of swinging thereon from the position shown in full lines Fig. 5 to the position shown in dotted lines, as well as capable of turning the clutch shaft 67 to any of the positions for the handle shown in Fig. 6. In any of these positions the clutch shaft is detained by a spring-pressed ball 71 in the casing cover engaging grooves in the enlarged end of the clutch shaft. It will be understood that in the central or upright position of the handle 70 the clutch sleeve is in its central or neutral position out of clutching engagement with either of the pinions 63 or 64 and consequently the wringer is idle, but that in the other positions shown in dotted lines the wringer is in gear and is driven in the direction indicated by said handle. A latch 72 is pivotally mounted on the gear-case cover 68 and is urged by a coiled spring 73 so that its lower end is pressed inwardly. Said end enters registering notches 74 in the engaged flanges of the wringer support sleeve 54 and the upper gear housing 52 to lock the wringer in any of the usual predetermined angular positions therefor and the upper end of the latch 72 is so positioned with respect to the handle 70 that a projection 75 of the latter will engage it and force it inwardly against the pressure of spring 73 to move the latch to the dotted line position shown in Fig. 5 and release the wringer to permit it to turn from one angular position to another when the handle member 70 is swung outwardly to its dotted line position in said figure. Inasmuch as the projection 75 of the handle 70 is only in position to release the latch 72 when said handle is in the neutral or upright position, it is obvious that the angular position of the wringer can only be changed when the wringer drive is disconnected and, in order to prevent the clutch from being operated when the wringer is being moved from one position to another or when it is in any angular position other than the predetermined positions for which notches 74 are provided, the handle 70 is provided with a pair of lugs 76 to engage on either side of the upper end of latch 72 when said latch is not engaged in the notches 74. This is the condition shown in Fig. 7, where, because of the wringer being in an angular position other than one of the predetermined operative positions therefor, the latch 72, being unable to fit in a notch 74 of the flange of the wringer support sleeve 54, is held by said flange in a position that causes its upper end to engage between the lugs 76, thus locking the handle 70 against movement in either direction to effect the engagement of the clutch for driving the wringer.

Thus it is not only impossible to shift the wringer from one position to another while it is in gear, but it is impossible to put it in gear until it is locked in one of its predetermined angular positions.

A clutch rod 77 extends alongside of the vertical shaft 49, being mounted at its upper end in a projection from the wringer support sleeve 54 and at its lower end in a projection 78 from the tubular bracket 47, said rod being turned by a handle 79 on its upper end and carrying a cam 80 at its lower end engaged by the end of a rod 81, which passes through the gear-case 31 and engages the clutch yoke 35 for moving it to cause the beveled gear 34 to become engaged or disengaged from the pinion 29 and thus control the operation of the agitator 30. The rod 81 is preferably provided with an adjusting nut 82 for varying its effective length and thereby obtain the desired throw of the clutch yoke.

A drain connection 83 is formed in the gear housing 31 and communicates with an opening in the mounting plate 23 and discharges through a hose 84 to drain the water from the container 15, said hose during the operation of the machine having its upper end supported by engaging a hook 85 thereon in a projection 86 on the wringer support sleeve 54, as shown in Fig. 5.

For draining the gear-case 31 a drain tube 87 is provided, which projects through a central opening in the spider 22 and has a plug 88 in its end, which may be removed for this purpose.

The gear-case and its attached motor bracket form a unit assembly which may be readily applied to the container whether the container constitutes a separate receptacle, as shown, or a part of a combination plumbing fixture such as a combination sink and washing machine. Thus these unit assemblies may be made up without regard to the nature of the container with which they are to be used, making for convenience and economy in manufacture. The addition of the wringer shaft 40 and its tubular bracket 47 in the event of the unit drive mechanism being appropriated for use with a washing machine of the type shown constitutes a simple, inexpensive operation and the assembled parts may readily be attached to the container by the adapting fit of the mounting plate therewith and the adapting connection by means of the lead filler 56, as described.

What I claim as new and desire to secure by Letters Patent is:

1. Driving mechanism for a washing machine having a container with an opening in the bottom and a mounting plate for said opening, comprising a gear-case secured to the bottom of the mounting plate, a bracket on the gear-case, a motor mounted on the bracket, a worm shaft extending across the gear-case and mounted in bearings in opposite walls thereof and driven by the motor, a vertical impeller shaft passing through the mounting plate in the same vertical plane as the worm shaft, a pinion on the impeller shaft, a worm wheel suitably mounted in the gear-case in said plane and meshing with the worm of the worm shaft, a wrist-pin on the worm wheel, a crank shaft journaled in bearings in opposite walls of the gear-case in the same vertical plane with the axis of the worm wheel and positioned between the worm shaft and the end of the impeller shaft, a connecting rod connecting the wrist pin with the crank of the crank shaft at one side of the vertical plane of the worm shaft and the impeller shaft, a beveled gear wheel splined on the crank shaft on the other side of said vertical plane and meshing with the pinion of the impeller shaft, a yoke pivotally mounted in the gear-case and engaging the beveled gear, and means passing through the wall of the gear-case for swinging the yoke.

2. Driving mechanism for a washing machine having a container with an opening in the bottom and a mounting plate for said opening, comprising in combination with said plate, an impeller shaft extending therethrough and provided with a beveled pinion on its end, a gear-case secured to the mounting plate, a removable cover on one side of the gear-case, a bracket secured to the gear-case, a motor mounted on the bracket, a worm-shaft extending across the gear-case in the vertical plane of the impeller shaft and connected with the motor, a shaft extending through one wall of the gear-case, a worm wheel thereon in the said vertical plane and meshing with the worm, a wrist-pin on the worm wheel, a crank shaft journaled in the cover plate and the opposite wall of the gear-case and having a crank of greater throw than the wrist-pin, a connecting rod connecting the crank with the wrist-pin at one side of said vertical plane, a beveled gear wheel splined on the crank shaft on the other side of said vertical plane and meshing with the pinion, and means passing through the wall of the gear-case for moving the beveled gear on the crank shaft.

3. Driving mechanism for a washing machine having a container with an opening in the bottom and a projection at the side and a mounting plate for said opening, comprising in combination with said plate, an impeller shaft extending therethrough and provided with a beveled pinion on its end, a gear-case secured to the mounting plate, a bracket on the gear-case, a motor mounted on the bracket, a worm shaft extending across the gear-case and mounted in bearings in opposite walls thereof and driven by the motor, a tubular angular casing extension secured to the casing, a second shaft and a vertical shaft journaled in said casing extension and geared together, a worm wheel on the second shaft in the gear-case meshing with the worm, a wrist-pin on the worm wheel, a crank-shaft journaled across the gear-case, a connecting rod connecting the crank of the crank shaft with the wrist-pin of the worm wheel, a beveled gear wheel splined on the crank shaft and meshing with the pinion of the impeller shaft, means passing through the wall of the gear-case for moving the beveled gear on the crank-shaft, the end of the casing extension containing the vertical shaft fitting within an opening in the projection at the side of the container, a poured metal filling between said casing extension and the walls of the opening in the projection from the side of the container, and means mounted on said casing extension and having driving connection with the vertical shaft.

4. Driving mechanism for a washing machine having a container with a projection at the side and an opening in the bottom and a mounting plate for said opening, comprising in combination with said plate, an impeller shaft mounted therein and provided with a beveled pinion on its end, a gear-case secured to the mounting plate, a motor-driven crank shaft in the gear-case, a beveled gear splined on the crank shaft and meshing with the beveled pinion, a clutch yoke pivotally mounted in the gear-case and engaging the beveled gear, an angular tubular casing extension secured to the gear-case, a second shaft and a vertical shaft journaled therein and geared together and having motor driving connection in the gear-case, a horizontal rod variable in length passing through the wall of the gear-case and engaging the clutch yoke, a clutch rod mounted in a vertical portion of the angular casing extension, a cam thereon bearing on the horizontal rod for operating the clutch yoke, and a handle on the clutch rod, said angular casing extension having its upwardly extending portion secured to the side projection of the container.

ANTON FRANK BROTZ.